United States Patent
Teigen et al.

(10) Patent No.: US 11,845,136 B2
(45) Date of Patent: Dec. 19, 2023

(54) ANTI-CORROSIVE BRAZE COATINGS

(71) Applicant: Rosemount Aerospace Inc., Burnsville, MN (US)

(72) Inventors: Daniel James Teigen, Lonsdale, MN (US); Kyle H. Rose, Savage, MN (US); Chad Kuha, Wayzata, MN (US); Karl Wachter, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 120 days.

(21) Appl. No.: 17/561,419

(22) Filed: Dec. 23, 2021

(65) Prior Publication Data

US 2023/0158594 A1     May 25, 2023

Related U.S. Application Data (60) Provisional application No. 63/282,911, filed on Nov. 24, 2021.

(51) Int. Cl.
*G01P 5/165*     (2006.01)
*B23K 1/00*     (2006.01)

(52) U.S. Cl.
CPC ............ *B23K 1/0008* (2013.01); *G01P 5/165* (2013.01)

(58) Field of Classification Search
CPC ........ G01P 13/025; G01P 5/165; G01P 13/02; G01P 5/14; G01P 5/16; G01P 5/00; G01P 5/02; G01P 5/12; G01P 5/245; G01P 21/025; G01P 5/07; G01P 5/04; G01P 1/02; G01P 1/08; G01P 5/10; G01P 5/06; G01P 5/18; G01P 5/26; G01P 13/045; G01P 5/005; G01P 5/08; G01P 21/00; G01P 3/62; G01P 5/175; G01P 5/24; G01P 15/00; G01P 15/036; G01P 5/006; G01P 5/083; G01P 5/086; G01P 5/241; G01P 7/00; G01P 5/001; B64D 43/02; B64D 15/20; B64D 43/00; B64D 15/12; B64D 1/18; B64D 1/20; B64D 15/16; B64D 15/22; B64D 2033/0286; B64D 33/02; B64D 45/00; B64D 33/08
(Continued)

(56) References Cited

U.S. PATENT DOCUMENTS 10,384,787 B2    8/2019    Gordon et al.
10,884,014 B2 *   1/2021    Golly ..................... G01P 5/165
(Continued)

FOREIGN PATENT DOCUMENTS

| EP | 3073275 B1 * | 9/2018 | ............ B64D 43/02 |
| EP | 3683584 A1 * | 7/2020 | ............ B64D 15/12 |
| EP | 3715859 A1 | 9/2020 | |

OTHER PUBLICATIONS

Extended European Search Report for EP Application No. 22209319.7, dated Apr. 12, 2023, 10 pages.

*Primary Examiner* — Andre J Allen
(74) *Attorney, Agent, or Firm* — Kinney & Lange, P.A.

(57) ABSTRACT

A corrosion-resistant air data probe includes a hollow tube having at least one opening, an inner surface of the hollow tube defining an interior cavity, a heating element, and a continuous layer of a braze material. The heating element is disposed adjacent to the inner surface, within the interior cavity. The continuous layer of the braze material completely covers the heating element and covers at least a portion of the inner surface.

20 Claims, 6 Drawing Sheets

(58) Field of Classification Search
USPC .................................................. 73/170.02
See application file for complete search history.

(56) References Cited

U.S. PATENT DOCUMENTS

| | | | |
|---|---|---|---|
| 11,209,330 B2* | 12/2021 | Golly | .................. G01L 13/00 |
| 11,262,227 B2* | 3/2022 | Jacob | .................. G01L 19/04 |
| 2019/0186974 A1 | 6/2019 | Golly et al. | |
| 2019/0291879 A1 | 9/2019 | Baker et al. | |
| 2019/0316946 A9* | 10/2019 | Golly | ................ G01P 13/025 |
| 2020/0123650 A1* | 4/2020 | Poteet | ................ C23C 16/0281 |
| 2020/0333206 A1 | 10/2020 | Golly et al. | |
| 2022/0363398 A1* | 11/2022 | Baker | ................ G01P 13/025 |

* cited by examiner

ANTI-CORROSIVE BRAZE COATINGS

CROSS-REFERENCE TO RELATED APPLICATION(S)

This application claims the benefit of U.S. Provisional Application No. 63/282,911 filed Nov. 24, 2021 for "ANTI-CORROSIVE BRAZE COATINGS" by D. Teigen, K. Rose, C. Kuha, and K. Wachter.

BACKGROUND

The present disclosure relates to air data probes, and more particularly, to air data probes with improved corrosion resistance.

Air data probe devices can be utilized in, e.g., aerospace applications for measuring environmental parameters usable to determine air data outputs. For instance, air data probes can measure pitot pressure, static pressure, or other parameters of airflow across the air data probe that are usable for determining air data outputs, such as pressure altitude, altitude rate (e.g., vertical speed), airspeed, Mach number, angle of attack, angle of sideslip, or other air data outputs. Such air data probes often include one or more air data sensing ports, such as static pressure ports located on the side of the probe integral to the surface of the probe that are pneumatically connected to sensors that sense the atmospheric pressure outside of the aircraft. Certain flight conditions can cause ice accumulation within an air data probe, degrading air data probe performance.

SUMMARY

In one embodiment, a corrosion-resistant air data probe includes a hollow tube having at least one opening, an inner surface of the hollow tube defining an interior cavity, a heating element, and a continuous layer of a braze material. The heating element is disposed adjacent to the inner surface, within the interior cavity. The continuous layer of the braze material completely covers the heating element and covers at least a portion of the inner surface.

In another embodiment, a method of fabricating an air data probe includes applying a braze material to an inner surface of an air data probe, positioning the air data probe in a first orientation relative to a direction of gravity, heating the air data probe while in the first orientation to braze a braze material to the inner surface and a heating coil disposed adjacent to the inner surface, applying additional braze material to the inner surface after heating the air data probe while in the first orientation, positioning the air data probe in a second orientation relative to the direction of gravity, and heating the air data probe while in the second orientation to braze the additional braze material to the inner surface and the heating coil. The air data probe comprises a hollow tube having at least one opening, an interior cavity of the hollow tube is defined by the inner surface, and the hollow tube is oriented along an axis. The second orientation is rotated about the axis relative to the first orientation.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure includes systems and methods of for improving corrosion resistance of air data probes. More specifically, the systems and methods disclosed herein use a layer of brazed material to protect heating elements and/or air data probe surfaces from corrosion. The systems and methods disclosed herein advantageously reduce the susceptibility of air data probes to corrosion-based failure.

Figure 1:
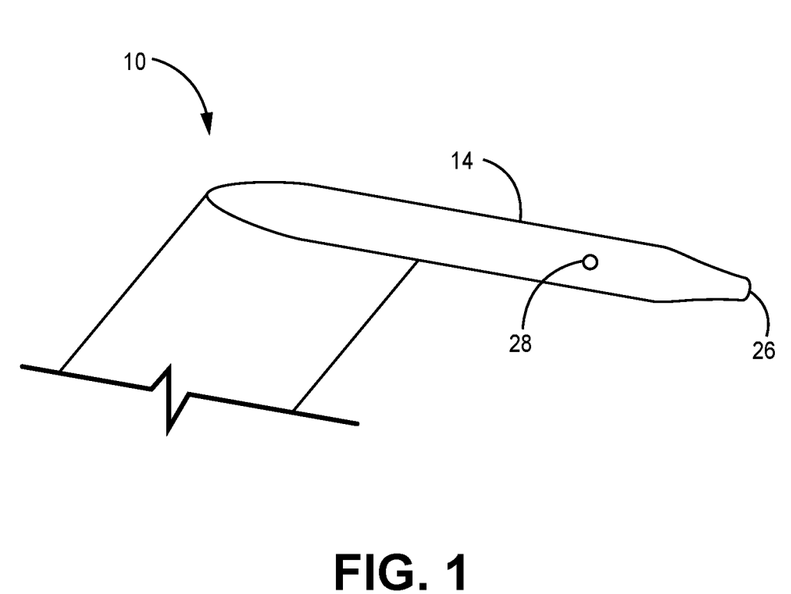
FIG. 1 is a perspective view of an example of an air data probe.

FIG. 1 is a perspective view of air data probe 10. Air data probe 10 includes tube 14 and sensing ports 26 and 28. In the depicted example, tube 14 includes a barrel- or cylinder-shaped portion and a tapered or conically-shaped section leading to sensing port 28. However, tube 14 can have other suitable geometries. Sensing ports 26 and 28 are formed integrally with tube 14 and are pneumatically connected to one or more sensors. Sensing ports 26 and 28 allow air data probe 10 to sense air data when air data probe 10 is placed in a flow or air. As depicted, sensing port 26 is a pitot pressure sensing port and sensing port 28 is a static pressure sensing port. However, air data probe 10 can have other combinations of one or more sensing ports for sensing a variety of air data.

Figure 2:
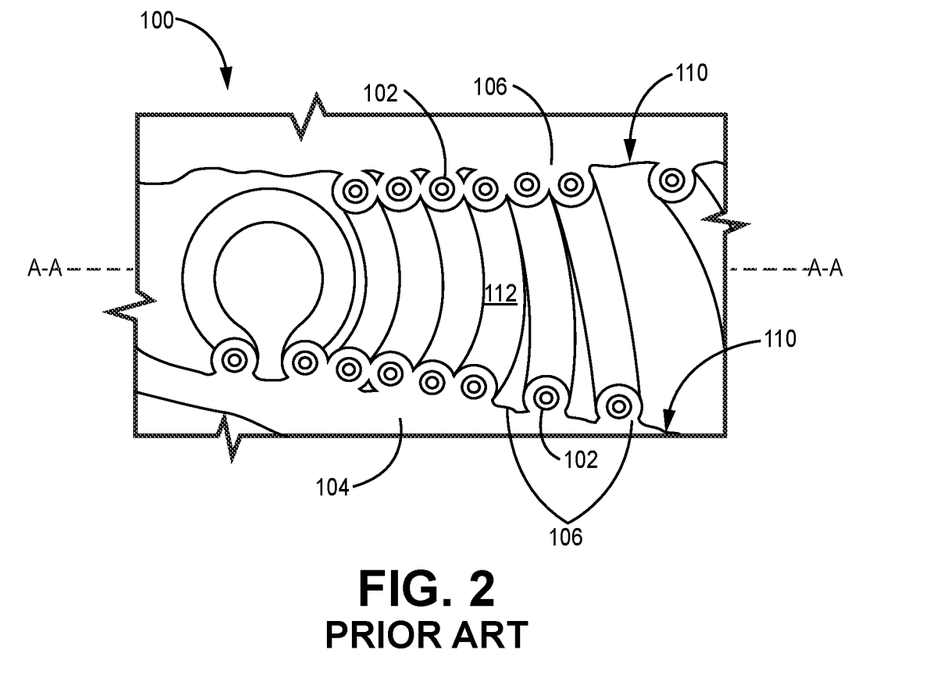
FIG. 2 is a cross-sectional image of an example of an air data probe.

FIG. 2 is a cross-sectional image of prior art air data probe 100. Air data probe 100 has overall structure as disclosed generally with regard to air data probe 10 of FIG. 1. Air data probe 100 includes heating element 102, tube 104, and braze 106. Tube 104 includes inner surface 110, which defines cavity 112. In the depicted example, tube 104 has a hollow conical shape and extends generally along axis A-A. However, tube 104 can be formed into other suitable shapes or combinations of multiple shapes. For example, tube 104 can be formed as a hollow cylinder. In another example, tube 104 can include both cylindrical and conical sections. Inner surface 110 defines cavity 112 and forms a channel through which a fluid, such as air, can flow or accumulate. Similar to tube 14, tube 104 has one or more openings or ports (not shown) such that air data probe 100 can take in air from a flow of air. One or more sensors can be coupled to and/or integrated with tube 104 for measuring air data. In operation, air data probe 100 is placed in a flow of air to measure air data of the flow of air. In some examples, air data probe 100 can be attached to an aircraft and used to determine one or more of pressure altitude, altitude rate (e.g., vertical speed), airspeed, Mach number, angle of attack, angle of sideslip, air speed, or another suitable air data parameter.

Heating element 102 is disposed within tube 104 adjacent to inner surface 110 and extends away from inner surface 110 into cavity 112. Heating element 102 is a resistive heating element configured to heat inner surface 110 during operation of air data probe 100. Heating element 102 is affixed to inner surface 110 by brazing, forming fillets of braze 106 between heating element 102 and inner surface 110. The portion of heating element 102 extending away from inner surface 110 is exposed to air in cavity 112. In FIG. 2, heating element 102 has a helical shape and wrap helically around inner surface 110 of tube 104. The helical shape of heating element 102 depicted in FIG. 2 improves uniformity of heating of inner surface 110. However, in other examples, heating element 102 has other shapes. In some examples, tube 104 is formed of a nickel material. In further examples, braze 106 is comprises a mixture of metals.

In low temperature conditions, ice can form on inner surface 110 and clog tube 104, impeding the flow of air through cavity 112 and thereby reducing the accuracy of air data collected with air data probe 100. Heating element 102 reduces ice formation along inner surface 110 by applying heat to inner surface 110. However, in corrosive environments, repeated heating and cooling of heating element 102 can cause corrosion of heating element 102 and/or tube 104, potentially leading to failure of heating element 102, tube 104, or another component of air data probe 100. The corrosive environment can be, for example, a saltwater air environment.

Figure 3:
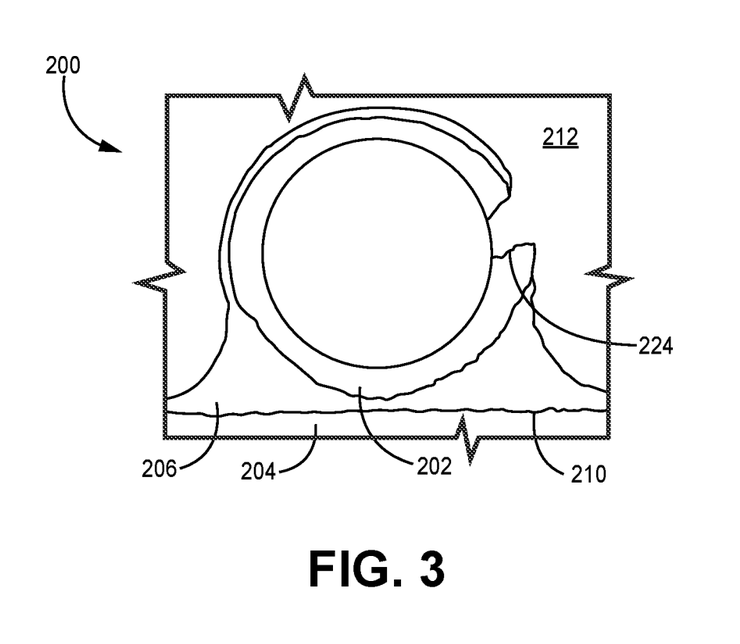
FIG. 3 is a cross-sectional image of an example of an air data probe having a partial anti-corrosive braze layer.

FIG. 3 is a cross-sectional diagram of air data probe 200, which has a partial layer of anti-corrosive braze material as compared to prior art air data probe 100, which lacks any layer of anti-corrosive braze material. Air data probe 200 includes heating element 202, tube 204, braze 206, inner surface 210, cavity 212, and uncovered region 224. Air data probe 200 is substantially similar to air data probe 100 and can perform substantially the same functions as air data probe 100, but includes braze 206, which covers more of heating element 102. Heating element 202, tube 204, inner surface 210, and cavity 212 are substantially similar to heating element 102, tube 104, inner surface 110, and cavity 112, respectively, as described with respect to FIG. 2.

Like braze 106, braze 206 affixes heating element 202 to inner surface 210 and can be formed of a metal material or a mixture of metal materials. However, braze 206 is formed of more braze material than braze 206 and covers more of heating element 202 than braze 106 covers of heating element 102. Notably, although braze 206 includes more braze material than braze 106, braze 206 does not cover all heating element 202. Specifically, uncovered region 224 of heating element 202 is not covered by braze 206.

Braze 206 confers corrosion protection to heating element 202 where braze 206 covers heating element 202. At uncovered region 224, heating element 202 has degraded due to corrosion, reducing or eliminating the ability of heating element 202 to melt ice that has accumulated on inner surface 210 of tube 204. To this extent, uncovered region 224 is a weak spot of heating element 202 that is not protected by a layer of braze 206 and that has increased susceptibility to corrosion as compared to the portions of heating element 102 that are covered by a layer of braze 206.

Figure 4A:
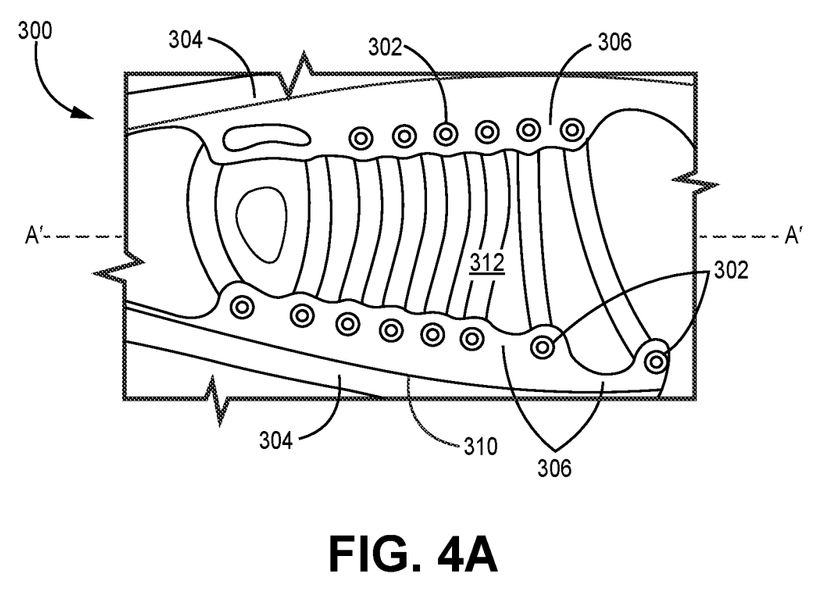
FIG. 4A is a cross-sectional image of an example of an air data probe having an anti-corrosive braze layer.
Figure 4B:
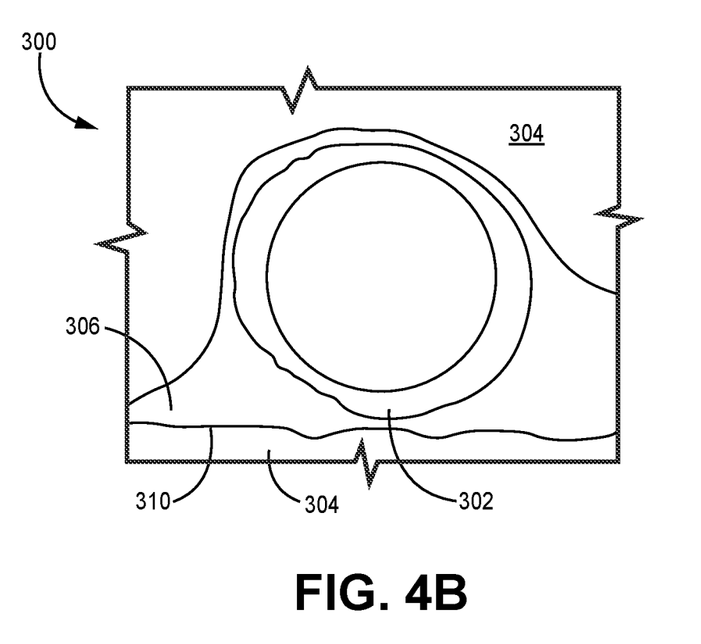
FIG. 4B is a cross-sectional image the heating element of the air data probe of FIG. 4A.

FIG. 4A is a cross-sectional view of air data probe 300, which has a complete anti-corrosive braze layer. FIG. 4B is a cross-sectional view of heating element 302 of air data probe 300 showing braze coverage across heating element 302. FIGS. 4A-B will be discussed together.

Air data probe 300 includes heating element 302, tube 304, and braze 306. Tube 304 includes inner surface 310, which defines cavity 312. Heating element 302, tube 304, inner surface 310, and cavity 312, are substantially similar to heating elements 102/202, tubes 104/204, inner surfaces 110/210, and cavities 112/212 respectively, as described with respect to FIGS. 2-3. Like air data probes 100 and 200, air data probe 300 can also include one or more sensors for sensing air data.

Braze 306 covers substantially all of heating element 302, affixing heating element 302 to inner surface 310 and forming a barrier between heating element 302 and cavity 312. Advantageously, the continuous barrier formed by braze 306 protects heating element 302 from corrosion-based failure and thereby also functions to prevent corrosion-based failure of heating wire 320, increasing the operational lifespan of heating element 302.

As shown more clearly in FIG. 4B, braze 306 forms a continuous layer that covers all of heating element 302 and at least a portion of inner surface 310 such that there are no uncovered regions of heating element 302. As braze 306 forms a continuous layer that covers all of heating element 302, heating element 302 does not have any uncovered regions or weak spots that have increased susceptibility to corrosion. To this extent, heating element 302 has reduced susceptibility to corrosion-based failure and an increased operational lifespan as compared to the uncovered heating element 102 shown in FIG. 2 and the partially covered heating element shown in FIG. 3. In some examples, braze 306 forms a continuous layer that covers the entirety of inner surface 310 and the entirety of inner surface 310, thereby conferring additional environmental protection to inner surface 310 of tube 304.

Figure 5:
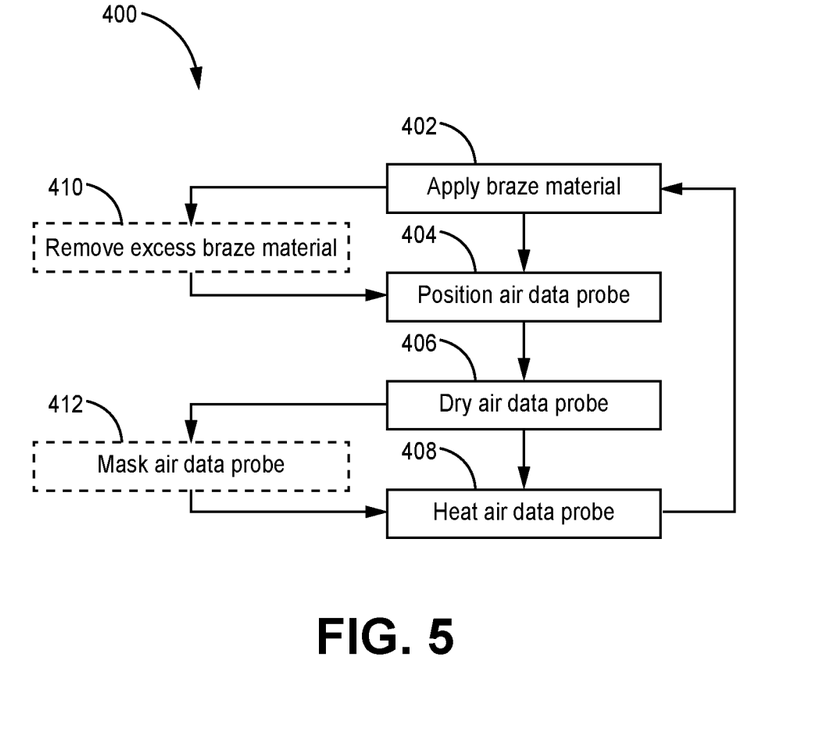
FIG. 5 is a flow diagram of an example of a method of fabricating a corrosion-resistant air data probe.

FIG. 5 is a flow diagram of method 400, which can be used to create a corrosion-resistant air data probe. Method 400 includes steps 402-408 of applying braze material (step 402), positioning the air data probe (step 404), drying the air data probe (step 406), and heating the air data probe (step 408). Method 400 optionally includes steps 410-412 of removing excess braze material (step 410) and masking the air data probe (step 412).

Prior to or as a preliminary step of method 400, heating element 302 is arranged within tube 304 of air data probe 300. In step 402 of method 400, a braze material is applied to inner surface 310 and heating element 302 of air data probe 300. To improve distribution of braze material along inner surface 310 and heating element 302, the braze material is to be applied as a slurry containing a powdered metal and a solvent. The metal can be, for example, a mixture of multiple metal materials. Following heating in step 406, the braze material applied in step 402 forms braze 306. In some examples, the slurry can also include a viscous element, such as a cement, to increase the viscosity of the slurry. Advantageously, the viscosity of the slurry can be selected to improve coverage of the braze material following heating in step 408, as will be explained in more detail subsequently. In some examples, tube 304 includes drain holes that are configured to allow for melted ice to flow out of tube 304 as during operation of air data probe 300. In these examples, the drain holes of tube 304 can be plugged prior to application of braze material in step 402 to prevent the braze material slurry from flowing out of the drain holes during method 400.

In step 404, air data probe 300 is positioned prior to heating in step 406. The position of air data probe 300 is selected to increase coverage and uniformity of braze 306 following heating in step 406, which advantageously improves the anti-corrosion properties conferred by braze 306. For example, air data probe 300 can be positioned substantially horizontally such that axis A'-A' is perpendicular to the direction of gravity. Advantageously, positioning air data probe 300 substantially horizontally prevents the braze material applied in step 402 from accumulating at an end (i.e., an end along axis A'-A') of tube 304 during drying of the braze material during step 406 prior to heating in step 408.

In step 406, the braze material applied in step 402 is dried to remove solvent from the braze material applied in step 402. The duration of drying can be selected based on the volatility of the solvent and the atmospheric conditions in which drying is performed. Advantageously, drying the braze material in step 406 reduces the ability of the unbrazed braze material to flow out of tube 304 during subsequent steps of method 400. As the braze material is in a slurry form until heating during step 408, the braze material can flow out of air date probe 300 or flow into regions where it is undesirable for brazing to occur during step 408. Air data probe can be cleaned following drying in step 406 to remove dried braze material from areas where brazing should not occur in step 408.

In step 408, air data probe 300 is heated to braze the powdered metal in the braze material applied in step 402, thereby forming a coating of braze 306 on heating element 302 and inner surface 310 Air data probe 300 can be heated in, for example, a vacuum furnace to braze the metal powder. Advantageously, braze 306 formed in step 408 functions both to affix heating element 302 to inner surface 310 and to protect inner surface 310 from corrosion.

In some examples of method 400, an excess of braze material is applied in step 402. The excess of braze material can be applied by, for example, filling cavity 312 with braze material. Cavity 313 can be filled with braze material by, for example, placing a cap on an open end of tube 304 and filling cavity 312 by injecting braze material through the cap. Air data probe 300 can be oriented substantially vertically such that axis A'-A' is substantially parallel with the direction of gravity as cavity 312 is filled with an excess of braze material. Advantageously, applying an excess of braze material increases the uniformity of braze material about inner surface 310 and heating element 302 prior to brazing in step 408. In examples where an excess of braze material, method 400 can include step 410 of removing excess braze material after step 402 (applying braze material) and before step 404 (positioning air data probe 300). Excess braze material can be removed by draining or another suitable method.

In further examples, method 400 includes step 412 of masking air data probe 300 following step 406 (drying air data probe 300) and before step 408 (heating air data probe 300). In step 412, a masking compound can be applied to one or more areas of air data probe 300 to prevent brazing and/or heat scale formation in those areas during step 408 of method 400. The masking compound can be, for example, a mica-based masking compound.

Although positioning tube 304 substantially horizontally in step 404 reduces the propensity of braze material to accumulate at an end of tube 304, gravity biases the distribution braze material slurry applied in step 402 to the gravitational bottom of tube 304, reducing the uniformity of coverage of braze 306 following step 408. Nonuniform coverage of braze 306 can result in uncovered regions of heating element 302. Similar to uncovered region 224 of heating element 102 of air data probe 200 discussed previously with respect to FIG. 3, uncovered regions of heating element 302 are susceptible to corrosion. To reduce or eliminate uncovered regions of heating element 302, method 400 can be repeated multiple times and tube 304 can be placed in a different position or orientation during step 404 of each subsequent iteration. Advantageously, changing the position of tube 304 during each subsequent iteration of method 400 can allow for regions that were previously at the gravitational top of tube 304 after step 404 to be placed closer to or at the gravitational bottom of tube 304 during a subsequent iteration.

The number of iterations can be selected to create a continuous covering of braze 306 over heating element 302 and at least a portion of inner surface 310 such that there are no uncovered regions of heating element 302. In some examples, performing only one iteration of method 400 can create a discontinuous braze layer that does not cover all of heating element 302, similar to braze 206 of air data probe 200. In these examples, subsequent iterations of method 400 can be used to ensure braze 306 coverage of regions that are not covered by braze 306 after a single iteration of method 400.

The number of iterations of method 400 can be further selected to ensure that the layer of braze 306 does not negatively impact performance of air data probe 300. Excessive braze 306 coverage can reduce the accuracy of measurements made using air data probe 300. Advantageously, a limited number of iterations of method 400 can be performed to apply a corrosion-resistant layer of braze 306 to heating element 302 without creating excessive braze 306 coverage that negatively impacts the performance of air data probe 300.

Air data probe 300 can be positioned in step 404 in each subsequent iteration according to, for example, the desired number of iterations. For example, where two iterations of method 400 are performed, the orientation of air data probe 300 in the second iteration can be rotated 180° about axis A'-A' relative to the orientation of air data probe 300 in the first iteration, such that braze material slurry is biased to different sides of air data probe 300 in different iterations of method 400. As a further example, where three iterations of method 400 of performed, the positions of air data probe 300 in each iteration can be offset by 60° about axis A'-A' relative to each other. Alternatively, air data probe can be rotated 180° about axis A'-A' in each subsequent iteration of method 400.

After the desired number of iterations of method 400 have been performed and an anti-corrosion layer of braze has been formed on inner surface 310 and heating element 302 of air data probe 300, air data probe 300 can be further processed by, for example, installation of one or more air data sensors.

Other operational parameters of method 400 can be adjusted to improve uniformity of braze following heating in step 408 of method 400. The viscosity of the slurry of braze material can affect flow characteristics of the braze material after it is applied to inner surface 310, and can be optimized to reduce accumulation of braze material at the gravitational bottom of tube 304 between steps 404 and 408. In examples where an excess of braze material is applied in step 402, the rate at which braze material is applied can be selected to reduce settling of powdered metal at the bottom of tube 304 along axis A'-A'. Where method 400 includes step 410, the rate at which excess braze material is removed can further be optimized to increase the uniformity of the distribution of unbrazed braze material along inner surface 310 and heating element 302. Generally, increasing the rate at which excess braze material is removed can increase the uniformity of the unbrazed braze material. Further, temperature to which the air data probe is heated in step 408 can be selected to optimize brazing of the braze material. Similarly, the rate at which the air data probe is heated can be selected to minimize accumulation of braze material at the gravitational bottom of tube 304 and thereby improve distribution uniformity of braze 306 following step 408.

Advantageously, method 400 allows for construction of air data probes with improved corrosion resistance as compared to existing methods. The improved corrosion resistance imparted by the inner braze layer created using method 400 reduces the susceptibility of an air data probe tube or heating element to corrosion-type failure modes. In addition to conferring corrosion-protection, the inner braze layer created using method 400 can further provide protection from other potential environmental effects that can lead to failure of one or more air data probe components.

Discussion of Possible Embodiments

The following are non-exclusive descriptions of possible embodiments of the present invention.

An embodiment of a corrosion-resistant air data probe includes a hollow tube having at least one opening, an inner surface of the hollow tube defining an interior cavity, a heating element, and a continuous layer of a braze material. The heating element is disposed adjacent to the inner surface, within the interior cavity. The continuous layer of the braze material completely covers the heating element and covers at least a portion of the inner surface.

The corrosion-resistant air data probe of the preceding paragraph can optionally include, additionally and/or alternatively, any one or more of the following features, configurations and/or additional components:

A corrosion-resistant air data probe according to an exemplary embodiment of this disclosure includes, among other possible things, a hollow tube having at least one opening, an inner surface of the hollow tube defining an interior cavity, a heating element, and a continuous layer of a braze material. The heating element is disposed adjacent to the inner surface, within the interior cavity. The continuous layer of the braze material completely covers the heating element and covers at least a portion of the inner surface.

A further embodiment of the foregoing corrosion-resistant air data probe, wherein the inner surface forms a hollow cylinder and the heating element has a helical shape.

A further embodiment of any of the foregoing corrosion-resistant air data probes, wherein the inner surface comprises a first material and the braze material comprises a second material.

A further embodiment of any of the foregoing corrosion-resistant air data probes, wherein the continuous layer of the braze material covers an entirety of the inner surface.

An embodiment of a method of fabricating an air data probe includes applying a braze material to an inner surface of an air data probe, positioning the air data probe in a first orientation relative to a direction of gravity, heating the air data probe while in the first orientation to braze a braze material to the inner surface and a heating coil disposed adjacent to the inner surface, applying additional braze material to the inner surface after heating the air data probe while in the first orientation, positioning the air data probe in a second orientation relative to the direction of gravity, and heating the air data probe while in the second orientation to braze the additional braze material to the inner surface and the heating coil. The air data probe comprises a hollow tube having at least one opening, an interior cavity of the hollow tube is defined by the inner surface, and the hollow tube is oriented along an axis. The second orientation is rotated about the axis relative to the first orientation.

The method of fabricating an air data probe preceding paragraph can optionally include, additionally and/or alternatively, any one or more of the following features, configurations and/or additional components:

A method of fabricating an air data probe according to an exemplary embodiment of this disclosure includes, among other possible things, applying a braze material to an inner surface of an air data probe, positioning the air data probe in a first orientation relative to a direction of gravity, heating the air data probe while in the first orientation to braze a braze material to the inner surface and a heating coil disposed adjacent to the inner surface, applying additional braze material to the inner surface after heating the air data probe while in the first orientation, positioning the air data probe in a second orientation relative to the direction of gravity, and heating the air data probe while in the second orientation to braze the additional braze material to the inner surface and the heating coil. The air data probe comprises a hollow tube having at least one opening, an interior cavity of the hollow tube is defined by the inner surface, and the hollow tube is oriented along an axis. The second orientation is rotated about the axis relative to the first orientation.

A further embodiment of the foregoing method of fabricating an air data probe, wherein the second orientation is rotated 180 degrees about the axis relative to the first orientation.

A further embodiment of any of the foregoing methods of fabricating an air data probe, wherein the axis is orthogonal to the direction of gravity when the air data probe is positioned in the first orientation and in the second orientation.

A further embodiment of any of the foregoing methods of fabricating an air data probe, wherein the axis is substantially parallel to the direction of gravity while the braze material is applied.

A further embodiment of any of the foregoing methods of fabricating an air data probe, wherein the braze material comprises a slurry.

A further embodiment of any of the foregoing methods of fabricating an air data probe, wherein the slurry further comprises a cement material.

A further embodiment of any of the foregoing methods of fabricating an air data probe, wherein applying the braze material to the inner surface of the air data probe comprises applying an excess of the braze material to the inner surface and removing a portion of the braze material from the inner surface after applying the excess of the braze material.

A further embodiment of any of the foregoing methods of fabricating an air data probe, further comprising at least partially drying the braze material after positioning the air data probe in the first orientation and before heating the air data probe in the first orientation.

A further embodiment of any of the foregoing methods of fabricating an air data probe, further comprising at least partially drying the braze material after position the air data probe in the second orientation and before heating the air data probe in the second orientation.

A further embodiment of any of the foregoing methods of fabricating an air data probe, wherein the inner surface is formed of a material that is different than the braze material.

A further embodiment of any of the foregoing methods of fabricating an air data probe, further comprising applying additional braze material to the interior cavity of the air data probe after heating the air data probe while in the second orientation, positioning the air data probe in a third orientation, and heating the air data probe while in the third orientation to braze the additional braze material to the inner surface and the heating coil.

A further embodiment of any of the foregoing methods of fabricating an air data probe, wherein the third orientation is rotated about the axis relative to the second orientation.

A further embodiment of any of the foregoing methods of fabricating an air data probe, wherein a continuous layer of the braze material covering the heating element and covering at least a portion of the inner surface is formed after heating the air data probe while in the second orientation.

A further embodiment of any of the foregoing methods of fabricating an air data probe, wherein the continuous layer of the braze material covers an entirety of the inner surface.

A further embodiment of any of the foregoing methods of fabricating an air data probe, wherein the inner surface forms a hollow cylinder and the heating element has a helical shape.

A further embodiment of any of the foregoing methods of fabricating an air data probe, further comprising attaching a nose cap to one opening of the tube before applying the braze material to the inner surface, wherein applying the braze material comprises injecting the braze material into the interior cavity through the nose cap.

A further embodiment of any of the foregoing methods of fabricating an air data probe, further comprising applying a masking compound to a portion of the tube after applying a braze material and before heating the air data probe while in the first orientation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A corrosion-resistant air data probe comprising:
   a hollow tube having at least one opening;
   an inner surface of the hollow tube defining an interior cavity;
   a heating element disposed adjacent to the inner surface, within the interior cavity; and
   a continuous solid layer of a braze material completely covering the heating element, and covering at least a portion of the inner surface.

2. The corrosion-resistant air data probe of claim 1, wherein the inner surface forms a hollow cylinder and the heating element has a helical shape.

3. The corrosion-resistant air data probe of claim 1, wherein the inner surface comprises a first material and the solid braze material comprises a second material.

4. The corrosion-resistant air data probe of claim 1, wherein the continuous layer of the solid braze material covers an entirety of the inner surface.

5. A method of fabricating an air data probe, the method comprising:
   applying a braze material to an inner surface of an air data probe, wherein:
   the air data probe comprises a hollow tube having at least one opening;
   an interior cavity of the hollow tube is defined by the inner surface;
   a heating coil is disposed adjacent to the inner surface; and
   the hollow tube is oriented along an axis;
   positioning the air data probe in a first orientation relative to a direction of gravity;
   heating the air data probe while in the first orientation to braze the braze material to the inner surface and the heating coil;
   applying additional braze material to the inner surface of the air data probe after heating the air data probe while in the first orientation;
   positioning the air data probe in a second orientation relative to the direction of gravity, wherein the second orientation is rotated about the axis relative to the first orientation;
   heating the air data probe while in the second orientation to braze the additional braze material to the inner surface and the heating coil.

6. The method of claim 5, wherein the second orientation is rotated 180 degrees about the axis relative to the first orientation.

7. The method of claim 5, wherein the axis is orthogonal to the direction of gravity when the air data probe is positioned in the first orientation and in the second orientation.

8. The method of claim 5, wherein the axis is substantially parallel to the direction of gravity while the braze material is applied.

9. The method of claim 5, wherein the braze material comprises a slurry.

10. The method of claim 9, wherein the slurry further comprises a cement material.

11. The method of claim 5, wherein applying the braze material to the inner surface of the air data probe comprises:
    applying an excess of the braze material to the inner surface; and
    removing a portion of the braze material from the inner surface after applying the excess of the braze material.

12. The method of claim 5, further comprising at least partially drying the braze material after positioning the air data probe in the first orientation and before heating the air data probe in the first orientation.

13. The method of claim 12, further comprising at least partially drying the braze material after positioning the air data probe in the second orientation and before heating the air data probe in the second orientation.

14. The method of claim 5, wherein the inner surface is formed of a material that is different than the braze material.

15. The method of claim 5, further comprising:
    applying additional braze material to the interior cavity of the air data probe after heating the air data probe while in the second orientation;
    positioning the air data probe in a third orientation, wherein the third orientation is rotated about the axis relative to the second orientation;
    heating the air data probe while in the third orientation to braze the additional braze material to the inner surface and the heating coil.

16. The method of claim 5, wherein a continuous layer of the braze material covering the heating element and covering at least a portion of the inner surface is formed after heating the air data probe while in the second orientation.

17. The method of claim 16, wherein the continuous layer of the braze material covers an entirety of the inner surface.

18. The method of claim 5, wherein the inner surface forms a hollow cylinder and the heating element has a helical shape.

19. The method of claim 5, further comprising attaching a nose cap to one opening of the tube before applying the braze material to the inner surface, wherein applying the braze material comprises injecting the braze material into the interior cavity through the nose cap.

20. The method of claim 5, further comprising applying a masking compound to a portion of the tube after applying a braze material and before heating the air data probe while in the first orientation.

\* \* \* \* \*